March 27, 1962 J. E. JENDRISAK 3,026,617
MACHINE FOR CUTTING GLASS PANES
Original Filed Sept. 12, 1957 2 Sheets-Sheet 1
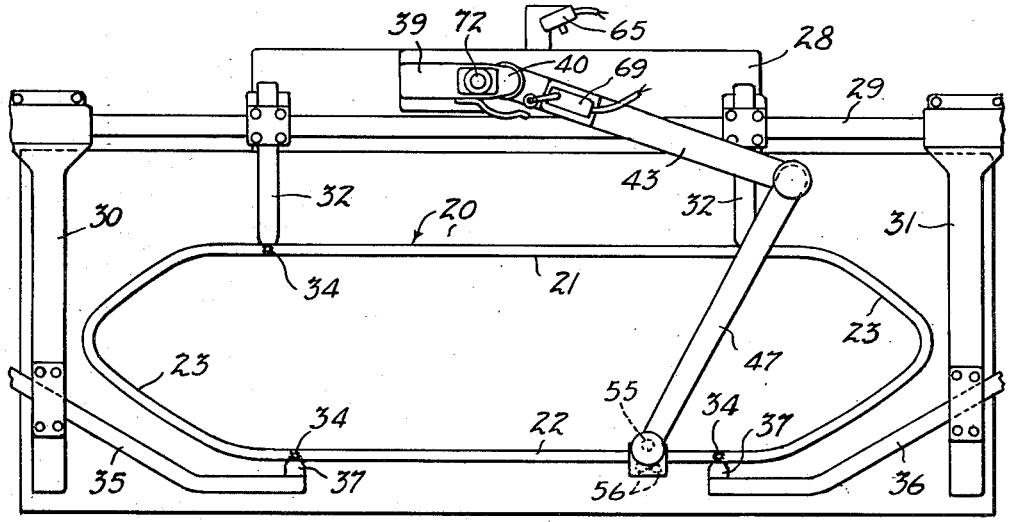
Fig. 1
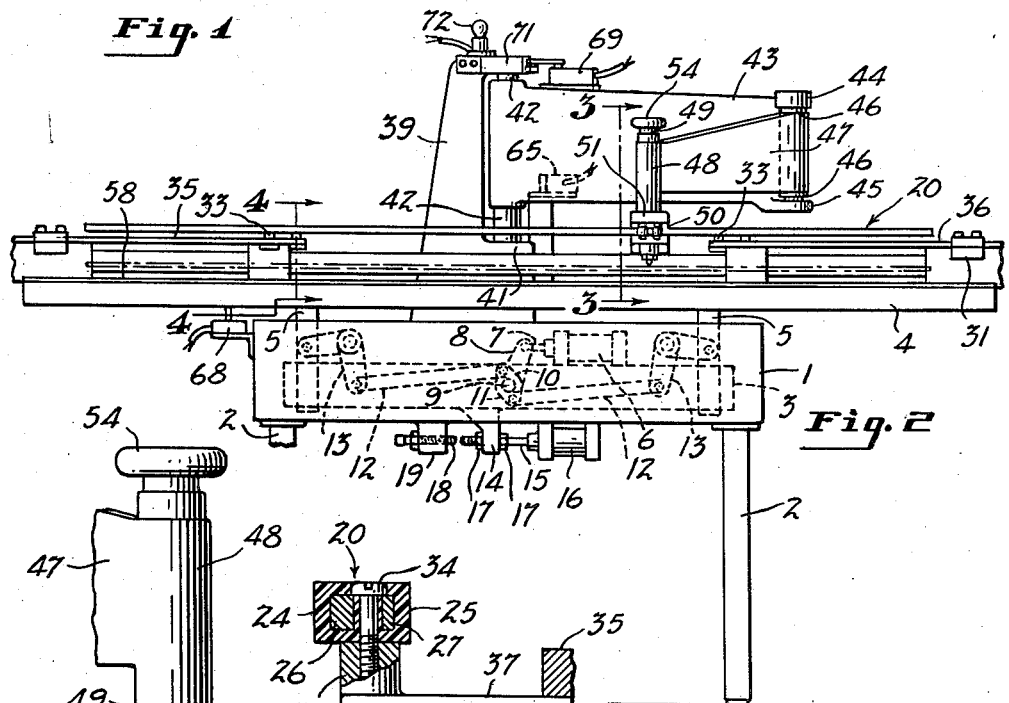
Fig. 2
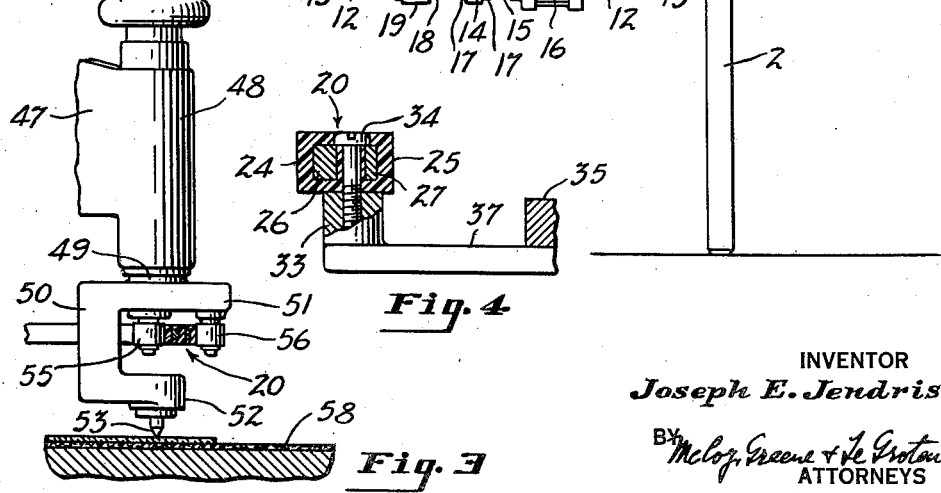
Fig. 4
Fig. 3
INVENTOR
Joseph E. Jendrisak
BY McCoy, Greene & DeGrotenhuis
ATTORNEYS

United States Patent Office 3,026,617
Patented Mar. 27, 1962

3,026,617
MACHINE FOR CUTTING GLASS PANES
Joseph E. Jendrisak, Northville, Mich., assignor to Shatterproof Glass Corporation, Detroit, Mich., a corporation of Delaware
Original application Sept. 12, 1957, Ser. No. 683,559. Divided and this application Aug. 11, 1960, Ser. No. 49,101
6 Claims. (Cl. 33—27)

This invention relates to glass cutting machines and particularly to a machine for cutting the glass panes that form the inner and outer layers of curved safety glass wind-shields and rear windows of automobiles, this application being a division of my copending application Serial No. 683,559, filed September 12, 1957, now abandoned.

The exterior panes of such curved windows need to be of slightly greater length than the inner panes so that after they are bent to curved form the end edges of the panes will aline. The present invention provides a templet for guiding a glass cutter in an endless path which conforms to the edge of the shorter glass pane and means is provided for bodily shifting the glass supporting table during the cutting operation in such manner as to cut a glass pane of a slightly greater length than is cut when the table is held stationary during the cutting operation.

The table shifting means is preferably automatically controlled and operates while the cutter is traveling along longitudinal edge portions of the pane being cut to shift the table endwise in one direction during travel of the cutter along one edge and in the opposite direction while the cutter is traveling along the opposite side edge of the pane. The table shifting means may also be so controlled that it is operative only during alternate pane cutting operations to produce pairs of glass panes suitable for the inner and outer layers of safety glass automobile windshields or rear windows.

Since the difference in the length of the inner and outer glass layers of curved safety glass windows depends upon the length and degree of curvature, means is preferably provided for varying the extent of shifting movement of the table upon each actuation so that the proper difference in the length of the panes cut by the machine may be provided.

Reference should be had to the accompanying drawings forming a part of this specification, in which:

FIGURE 1 is a top plan view of a glass cutting machine embodying the invention;

FIG. 2 is a side elevation of the machine shown in FIG. 1;

FIG. 3 is a fragmentary view showing the cutter head on an enlarged scale and in side elevation;

FIG. 4 is a fragmentary section taken on the line indicated at 4—4 in FIG. 2.

Figure 5:
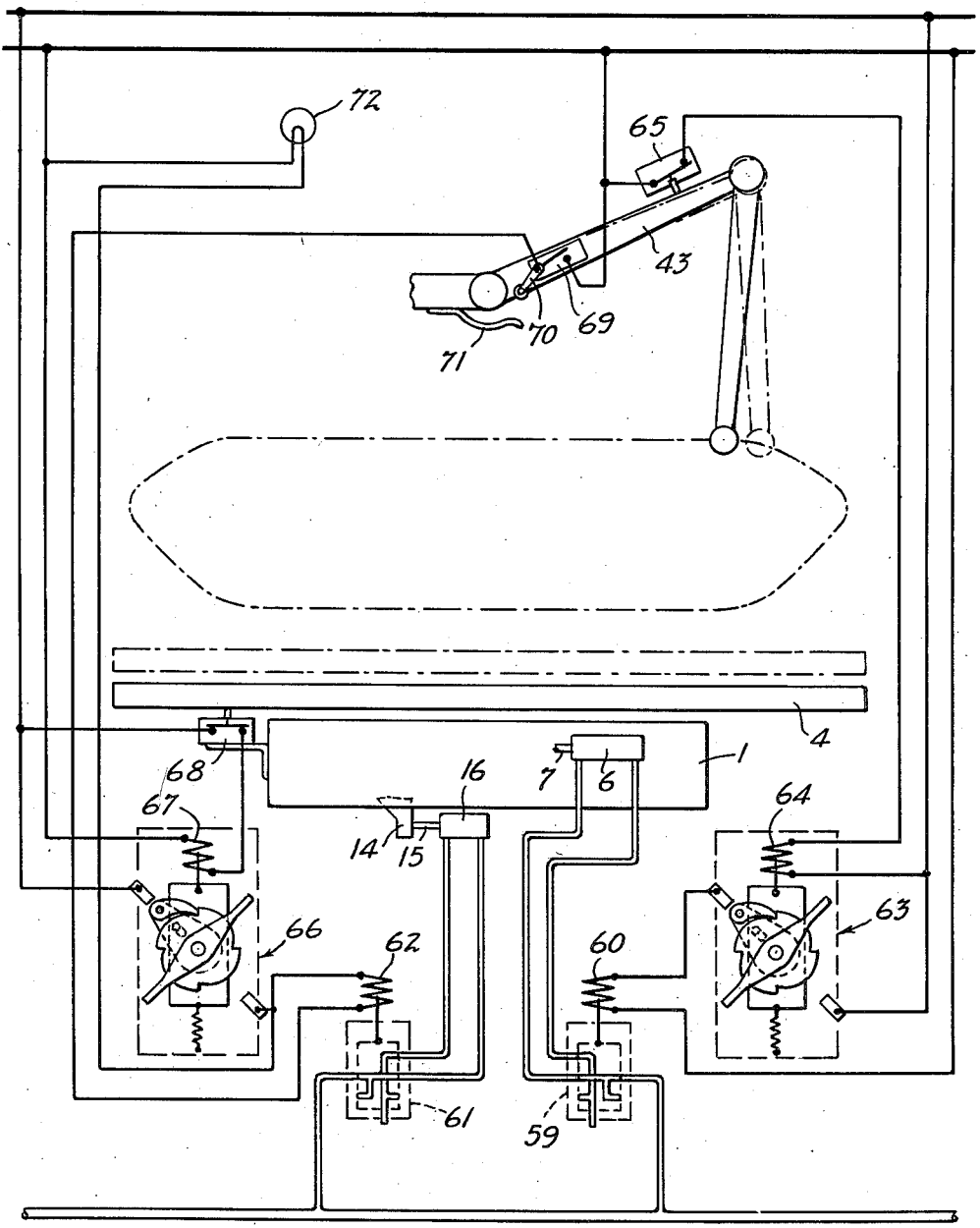
FIG. 5 is a diagrammatic view showing the table actuating means and the controls for said actuating means.

As shown in the drawings, the glass cutting machine of the present invention has an elongated horizontally disposed body 1 supported on legs 2. The body 1 provides a support for a longitudinally movable slide 3 which supports a vertically movable table 4 that has vertical posts 5 rigidly attached thereto and slidably mounted in the slide 3. Any suitable means may be provided for raising and lowering the table 4 on the slide 3 and for shifting the slide 3 longitudinally. As herein shown, the means for raising and lowering the table comprises a horizontal cylinder 6 mounted on the slide 3 that has a piston 7 connected to an arm 8 fixed to a horizontal cross shaft 9. The shaft 9 has upwardly and downwardly extending arms 10 and 11 that are connected by links 12 to bell crank levers 13 that are pivoted on the slide 3 and connected to the posts 5 to simultaneously move the posts upwardly and downwardly to raise and lower the table 4.

As herein shown, fluid pressure means is also employed to shift the slide and table horizontally, the slide 3 having a downwardly projecting lug 14 that is attached to the piston 15 of a horizontal cylinder 16 attached to the body 1. The piston 15 is adjustably connected to the lug 14, being provided with a threaded end portion that receives adjusting nuts 17 that engage with opposite faces of the lug 14. The movement of the slide 3 is limited by means of an adjustable stop in the form of a screw 18 threaded in a lug 19 attached to the body 1 and in axial alinement with the piston 15.

The table 4 provides a support for a glass pane to be cut and an endless elongated templet 20 is mounted in a fixed horizontal position overlying the table 4, the templet 20 providing a guide for a suitable glass cutter that engages a glass pane supported on the table 4 when the table is in elevated position. The templet 20 has straight elongated parallel sides 21 and 22 and curved ends 23. The templet 20 is of a size slightly larger than the pane to be cut, but conforms to the shape of the pane so that a cutter properly positioned on a carrier guided by the templet will accurately cut a pane of the desired dimensions. The templet is preferably substantially rectangular in cross section and is provided with smooth vertical interior and exterior faces 24 and 25.

In order to provide an inexpensive templet which will provide an accurate guide for the cutter, the templet is preferably formed of a thermoplastic casting resin of high compressive strength such as an epoxy resin, and in order to give the templet adequate strength it is reinforced by inner and outer bands 26 and 27 of steel, fiber glass or other suitable reinforcing material, the bands 26 and 27 being of a size and shape to be completely embedded within the templet with the interior face of the inner band spaced outwardly from the interior face of the templet and the exterior face of the outer band spaced inwardly from the exterior face of the templet, so that the guiding faces of the templet are composed of the thermoplastic resin.

The templet 20 is supported over the table 4 in such manner that a suitable cutter head or carriage may be guided in an endless path. As herein shown, a stationary supporting member 28 which may be carried by the body 1 extends along one side of the table 4 and the supporting member 28 carries an elongated supporting bar 29 parallel to the table and above the same when the table is in its uppermost position. The supporting bar 29 has laterally projecting arms 30 and 31 rigidly attached thereto that overlie the ends of the table 4 and the templet 20 is supported by the bar 29 and arms 30 and 31. Arms 32 projecting laterally over the table 4 from the bar 29 have inner ends beneath the side 21 of the templet, each arm 32 having an upwardly projecting inner end portion 33 which engages the bottom of the templet 20 which is secured to the projecting portions 33 by means of bolts 34. The opposite side 22 of the templet is supported by longitudinal arms 35 and 36 that project toward one another from the arms 30 and 31 to which they are rigidly attached. The arms 35 and 36 have laterally projecting end portions 37 that are attached to the under side of the side 22 of the templet in a manner similar to the attachment of a straight side 21 to the arms 32, the lateral projections 37 having upwardly projecting inner ends 33 that engage the under side of the templet. The glass cutter that is guided by the templet 20 is preferably supported independently of the templet which serves merely to guide the cutter.

As herein shown, the supporting member 28 carries a cutter supporting bracket 39 which has vertically alined upper and lower bearing portions 40 and 41 in which the trunnions 42 of a cutter supporting arm 43 are journaled. At its free end the arm 43 has vertically alined upper and lower bearings 44 and 45 in which the trunnion 46 of a second arm 47 is journaled. The arms 43 and 47 are horizontally disposed and overlie the table 4 and templet 20. The arm 47 has a vertical bearing portion 48 at its free end that receives a vertical shaft 49 to the lower end of which a cutter head 50 is attached. The head 50 is of substantially U-shape, having a horizontally disposed upper arm 51 to which the shaft 49 is attached and having a horizontal lower arm 52 spaced downwardly from the arm 51 and of less length than the arm 51. A cutter 53 is attached to the lower arm 52 and projects downwardly therefrom for engagement with the glass to be cut and the upper end of the shaft is provided with a hand wheel 54 by means of which the shaft 49 and head 50 may be adjusted vertically. A single roller 55 mounted on the under side of the arm 51 engages the interior face 24 of the templet 20 and a pair of laterally spaced vertical rollers 56 engage the exterior face 25 of the templet. Pivotal mounting of the head 50 in the arm 47 permits the head to travel around the curved ends 23 of the templet and the cutter may be moved manually in an endless path by moving the head 50 along the sides and around the ends of the cam 20.

The table 4 is moved by means of the cylinder 6 from a loading position far enough below the cutter 53 to permit panes of glass to be placed on and removed from the table, to a cutting position where a pane of glass supported on the table 4 is engaged with the cutter 53. A layer 58 of felt on the table 4 provides a cushion for the glass pane being cut. After the table has been raised to bring the glass into engagement with the cutter 53, the cutter head 50 is moved in an endless path counterclockwise on the templet 20 to cut a glass pane corresponding in shape to the shape of the templet.

In order to provide pairs of glass panes suitable for the inner and outer layers of a curved safety glass windshield or rear automobile window, the machine is designed to move the slide 3 back and forth during alternate pane cutting operations. During the travel of the cutter head 50 along the side 21 the cylinder 16 is actuated to impart a movement to the slide 3 in one direction and during the movement of the head 50 in the opposite direction along the side 22 of the templet, the slide 3 is returned to its original position so that the glass cut is slightly longer than the panes that are cut while the table is stationary.

As shown in FIG. 5 of the drawings, the operation of the cylinder 6 is controlled by means of a valve 59 that is operated by suitable means such as a solenoid 60 which causes the table 4 to be raised and lowered. The table shifting cylinder 16 is controlled by a valve 61 operated by suitable means such as a solenoid 62. The valve 59 is normally positioned to hold the piston 7 in retracted position and the table 4 in its lowermost position. When the solenoid 60 is energized the pressure is reversed in the cylinder 6 and the table is moved to its uppermost position. The solenoid 60 is energized during the glass cutting operation to hold the table in its uppermost position, the movements of the table being controlled by movements of the cutter supporting arm 43 which controls a ratchet switch 63 through an actuating solenoid 64. The arm 43 closes a limit switch 65 upon the completion of each glass cutting cycle to impart a quarter turn to the ratchet switch 63 to move the same a quarter turn from a circuit closing to a circuit opening position, the switch 63 being in series with the solenoid 60 and deenergizing the same when moved to its open position. After a cut pane has been removed from the table 4 and a pane to be cut has been placed upon the table, the arm 47 is actuated to swing the arm 43 back into engagement with the switch 65 to energize the solenoid 64 and move the switch 65 into circuit closing position to again elevate the table 4 and hold it in elevated position.

The solenoid 62 operating the valve 61 is controlled by a second ratchet switch 66 in series therewith which is actuated by means of a solenoid 67 controlled by a limit switch 68 that is closed each time the table moves to its lowermost position. While the shorter pane of glass is being cut the ratchet switch 66 is in its intermediate circuit breaking position and the solenoid 62 is deenergized. Every second time the table 4 is lowered the ratchet switch 66 is brought to circuit closing position so that the solenoid 62 is brought under the control of a switch 69 carried by the arm 43. The switch 69 is a normally open switch which has an arm 70 that engages with a cam 71 to hold the switch 69 closed during a portion of the movement of the cutter head 50 around the templet. When the switches 66 and 69 are both closed the solenoid 62 is energized, operating the valve 61 to cause the slide 3 and table 4 to be shifted by the cylinder 16, and when the switch 69 is again opened the solenoid 62 is deenergized, causing the valve 61 to shift to its original position and returning the table 4 to its original position. The arm 70 engages the cam 71 while the cutter head 50 is traveling over the side 21 of the templet and remains closed while the cutter head 50 is moving around the left-hand end 23 of the templet 20. When the head reaches the straight side portion 22 of the templet the arm 43 will have begun its return movement and while the head 50 is moved along the straight portion 22 of the templet the arm 70 will be disengaged from the cam 71 and the switch 69 will open to deenergize the solenoid 62 and return the piston 15 and slide 3 to its original position.

A signal lamp 72 is provided for indicating to the operator when the circuits are conditioned for cutting the longer glass pane, the signal lamp 72 being connected in series with the ratchet switch 66 so that it is lighted while the switch 66 is in its circuit closing position. The light 72 is in parallel with the switch 69 and solenoid 62 so that it does not interfere with the control of the solenoid 62 by the switch 69.

It is to be understood that in accordance with the provisions of the patent statutes, variations and modifications of the specific devices herein shown and described may be made without departing from the spirit of the invention.

What I claim is:

1. In a glass cutting machine having a pane supporting table, an endless templet above said table and having parallel side portions and a glass cutter guided by said templet and movable in an endless path parallel to the surface of said table, said table being movable vertically relative to said cutter from a loading and unloading position spaced from the cutter to a cutting position where a glass pane on the table engages said cutter, the improvement which comprises means for shifting said table bodily relative to the cutter and templet in either direction parallel to said side portions of said templet, controlling means responsive to a movement of said cutter along one of said side portions of said templet for actuating said shifting means in one of said directions and to movement of said cutter along the opposite side portion of said templet for actuating said shifting means in the opposite direction, and means for rendering said controlling means inoperative, whereby glass panes of different length may be cut.

2. A glass cutting machine such as set forth in claim 1 in which means is provided for adjusting the extent of the shifting movement of the table relative to the cutter and template to increase or decrease the difference in the length of panes cut.

3. A glass cutting machine such as set forth in claim 1, in which the means for rendering the controlling means inoperative is controlled by vertical movements of the table relative to the cutter.

4. In a glass cutting machine having a pane supporting table, an endless templet parallel to and overlying said table and having parallel side portions and a glass cutter mounted on said templet to travel in an endless path parallel to the surface of said table, said table being movable vertically relative to said cutter from a loading and unloading position spaced from said cutter to a cutting position where a glass pane on said table engages said cutter, the improvement which comprises means controlled by movements of said cutter along said templet for moving said table vertically relative to said cutter to and from the cutting position, means for shifting said table bodily back and forth a predetermined distance relative to the cutter and templet in a path parallel to said side portions of said templet, controlling means responsive to a movement of said cutter along one of said side portions of said templet for actuating said shifting means in one direction and to movement of said cutter along the other of said side portions of said templet for actuating said shifting means in the opposite direction, and means controlled by the vertical movements of the table with respect to the cutter for rendering said controlling means inoperative during alternate pane cutting operations.

5. A glass cutting machine such as set forth in claim 4 in which a signal controlled by vertical movements of the table relative to the cutter indicates the positioning of the table relative to the cutter for alternate pane cutting operations.

6. In a glass cutting machine having a table with a horizontal pane supporting top face, an elongated endless templet horizontally disposed above said table and having parallel longitudinal side portions and a glass cutter mounted on said templet to travel in a horizontal endless path, said table being movable vertically relative to said cutter from a loading and unloading position spaced from said cutter to a cutting position in which a glass pane thereon engages said cutter, the improvement which comprises means controlled by movement of said cutter along said templet for moving said table vertically to and from its pane cutting position, means for shifting said table back and forth from a predetermined position relative to said templet, adjustable stop means for limiting the extent of said shifting movement, controlling means responsive to a movement of said cutter along one of said side portions of said templet for actuating said shifting means in one direction and to movement of said cutter along the other of said side portions for actuating said shifting means in the opposite direction, and means responsive to alternate downward movements of said table relative to said cutter for rendering said controlling means operative and to the downward movements intermediate said alternate downward movements for rendering said controlling means inoperative.

No references cited.